United States Patent
Brackebusch

[19]

[11] Patent Number: 6,125,622

[45] Date of Patent: Oct. 3, 2000

[54] WINDROW TURNER

[76] Inventor: Albert L. Brackebusch, HCR 60, Box 171, Bonners Ferry, Id. 83805

[21] Appl. No.: 09/190,934

[22] Filed: Nov. 12, 1998

[51] Int. Cl.⁷ .................................................. A01D 84/00
[52] U.S. Cl. .......................... 56/367; 56/365; 56/DIG. 21
[58] Field of Search ............................ 56/DIG. 21, 365, 56/367, 370, 375, 376, 378

[56] References Cited

U.S. PATENT DOCUMENTS

| | | | |
|---|---|---|---|
| D. 273,792 | 5/1984 | Ender, Sr. ................................ | D15/27 |
| D. 306,737 | 3/1990 | VanGinhoven et al. .................. | D15/27 |
| 694,344 | 3/1902 | Baird ........................................ | 56/376 |
| 2,168,266 | 8/1939 | McElwain ................................. | 56/376 |
| 2,511,100 | 6/1950 | Clark ........................................ | 56/376 |
| 2,529,577 | 11/1950 | Schempp et al. ................... | 56/DIG. 21 |
| 2,609,651 | 9/1952 | Cymara .............................. | 56/DIG. 21 |
| 3,221,484 | 12/1965 | Van Der Ley ............................ | 56/370 |
| 3,879,923 | 4/1975 | Granger .................................... | 56/376 |
| 3,884,022 | 5/1975 | Landolt .................................... | 56/370 |
| 3,982,772 | 9/1976 | Scherer .................................... | 56/370 |
| 4,188,160 | 2/1980 | Corbett et al. ............................ | 406/58 |
| 4,203,277 | 5/1980 | Kaetzel .................................... | 56/376 |
| 4,524,575 | 6/1985 | Nilsen ...................................... | 56/372 |
| 4,693,065 | 9/1987 | Aron et al. ......................... | 56/DIG. 21 |
| 4,730,447 | 3/1988 | Fisher et al. .............................. | 56/377 |
| 4,738,092 | 4/1988 | Jennings .................................... | 56/372 |
| 4,748,803 | 6/1988 | MacMaster et al. ...................... | 56/370 |
| 4,777,788 | 10/1988 | Laquerre .................................. | 56/376 |
| 4,793,125 | 12/1988 | Ehrhart et al. ............................ | 56/16.1 |
| 4,809,490 | 3/1989 | Swanson .................................. | 56/370 |
| 4,926,625 | 5/1990 | Laquerre .................................. | 56/376 |
| 5,163,277 | 11/1992 | Fransgaard .............................. | 56/367 |
| 5,175,987 | 1/1993 | Underhill et al. ................. | 56/DIG. 21 |
| 5,191,754 | 3/1993 | Morey ...................................... | 56/13.3 |
| 5,203,154 | 4/1993 | Lesher et al. ...................... | 56/DIG. 21 |
| 5,251,431 | 10/1993 | Shoop ............................... | 56/DIG. 21 |
| 5,309,703 | 5/1994 | Brinton .................................... | 56/370 |
| 5,596,868 | 1/1997 | Gerbrandt ................................ | 56/365 |

FOREIGN PATENT DOCUMENTS

| | | | |
|---|---|---|---|
| 2157535A | 10/1985 | United Kingdom .................... | 56/367 |

*Primary Examiner*—Thomas B. Will
*Assistant Examiner*—Meredith C Petravick
*Attorney, Agent, or Firm*—Wells, St. John, Roberts, Gregory & Matkin, P.S.

[57] ABSTRACT

A windrow turner is described in which a wheeled frame is provided including a forward and a rearward end. A windrow pick-up on the frame adjacent the forward end, and a substantially upright helical auger flight is situated rearwardly adjacent the windrow pick-up. A drive is connected to the auger flight and is selectively operable to rotate the auger flight about an auger axis in a lifting mode such that material engaging the rotating auger flight is lifted upwardly by the auger flight. A guide between the windrow pick-up and auger leads angularly from the windrow pick-up to the auger flight. The auger flight rotates about the auger axis to engage the windrow lifted by the windrow pick-up and progressively inverts the windrow by turning the windrow laterally where a discharge chute on the frame receives and guides the inverted windrow back to the ground surface.

21 Claims, 5 Drawing Sheets

WINDROW TURNER

TECHNICAL FIELD

The present invention relates to turning or inverting windrows of cut vegetation.

BACKGROUND OF THE INVENTION

It is common farming practice to turn windrows of cut vegetation in order to allow the vegetation to properly dry and to prevent mildew. Windrow turning is almost a required procedure when cut and windrowed alfalfa, for example, is dampened by rain. It is desirable to have a relative homogenous moisture content in the windrow for proper and effective baling procedures. A wet bale can cause serious damage by spontaneous combustion, or by decomposing spreading decomposition to adjacent bales. On the other hand, a cut windrowed crop will retain more valuable nutrients as feed if it is cured properly in the windrows prior to baling. In the distant past, windrows were turned either by hay rakes or by hand. Either procedure was time consuming and not always effective.

Several use-specific apparatus have been developed for turning windrows, aside from the typical hay rakes (which will not operate efficiently in many situations). Such apparatus generally are towed behind a tractor and turn the windrows as the tractor moves forwardly. However many prior apparatus also guide the windrow through a tortuous path to accomplish the inversion process. A heavy cutting or dense windrow will often plug in the windrow turning apparatus, or the apparatus must be moved so slowly as to be impractical.

An improvement in windrow turning apparatus is disclosed in U.S. Pat. No. 5,596,868 to Gerbrandt. This device includes a shaped moldboard mounted behind a reel pick-up. The moldboard is curved to receive and invert the windrow material as it is received from the pick-up reel. While this apparatus will likely work well at low speeds and with relatively dry, loose materials, on flat ground or while moving uphill, it appears possible that wet dense material could bind along the moldboard and plug the machine or cause clumps of material to develop. It also appears possible that the sliding motion of the windrow along the moldboard would be hampered by gravity when the unit is moving downhill or on a side hill where the material will naturally tend to slide away from the moldboard.

It is an object of the present invention to provide a windrow turner that will function at relatively high speeds to turn windrows of material reliably and evenly.

It is another objective of the windrow turner to place the windrow on dry ground adjacent to the original windrow location.

It is a further object to provide such a windrow turner that will function well on uneven terrain.

It is a still further object to provide such a windrow turner that will fluff the material of a windrow as it is being inverted.

A yet further object is to provide such a windrow turner that will function well to handle wet, dense materials.

Another object is to provide such a windrow turner that is relatively simple in construction and easy to operate.

The above and still further objects and advantages will become apparent from the following description which, taken with the accompanying drawings describe a preferred mode for putting the invention into effect.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Figure 1:
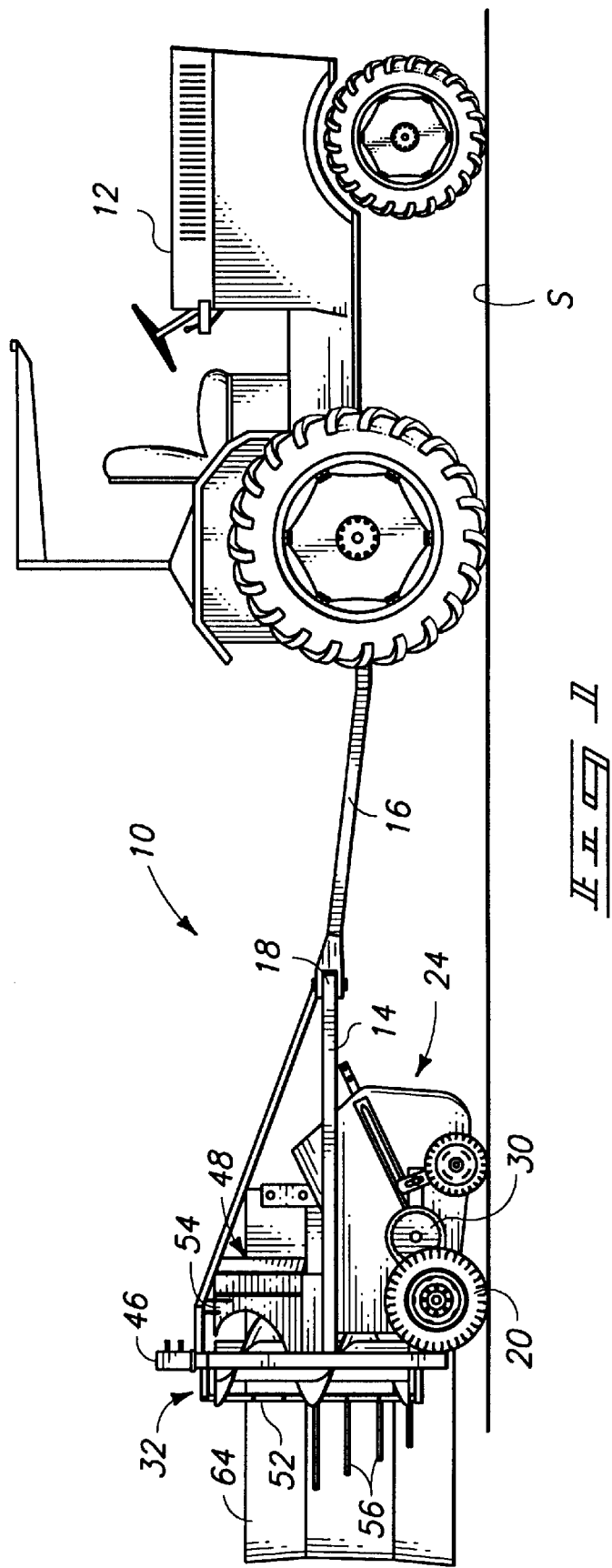
FIG. 1 is a side elevation view of a preferred form of the present windrow turner attached to a towing vehicle.

This disclosure of the invention is submitted in furtherance of the constitutional purposes of the U.S. Patent Laws "to promote the progress of science and useful arts" (Article 1, Section 8).

A preferred form of the present windrow turner is generally shown in the drawings by the reference numeral 10. The turner 10 may be provided as shown for attachment to a towing vehicle such as a tractor 12. While this version is preferred, it is also possible that the turner 10 could be produced as a self powered implement (not shown).

Figure 5:
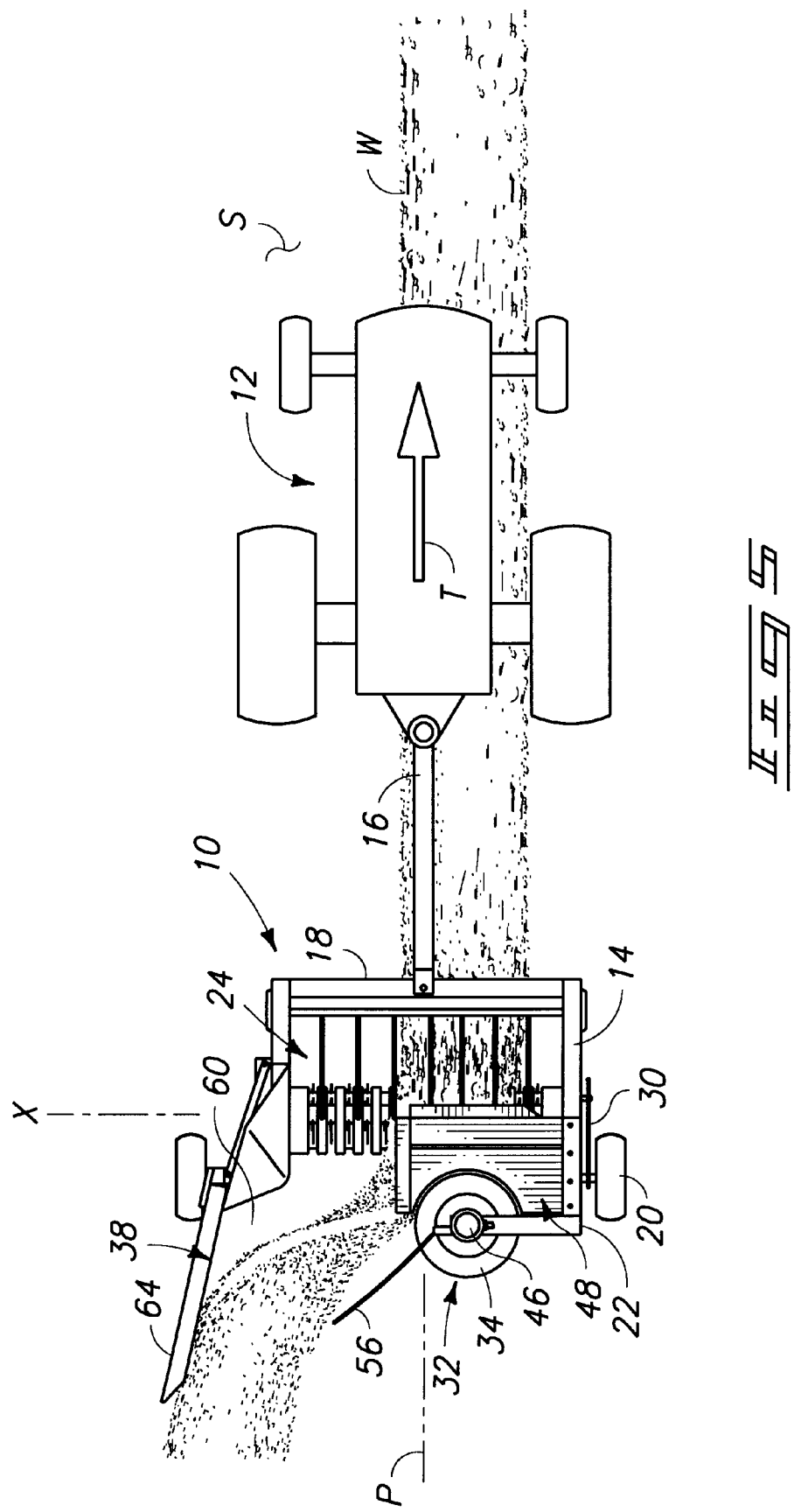
FIG. 5 is a top plan view showing a preferred form of the present windrow turner in operation.

In preferred forms, the present turner 10 includes a wheeled frame 14. In the example shown, the wheeled frame 14 includes a towing tongue 16 at a forward end 18 and ground engaging wheels 20 supporting the structure for movement along the ground surface S for purposes of turning a windrow W of cut vegetation (FIG. 5). For purposes of orientation, the general frame 14 also includes a rearward end 22.

The frame structure is constructed of welded, or otherwise fastened or formed structural members, preferably formed of steel in a manner similar to conventional farm implements.

A windrow pick-up 24 is provided on the frame adjacent the forward end 18. The particular construction of the preferred pick-up may be similar to those used on numerous balers. As such, the exemplary pick-up includes a pick-up reel 26 on the frame adjacent the forward end, with rake tines 28 rotatable on a reel axis X that is substantially horizontal and normal to the forward path of travel T (FIG. 5). The tines are rotated to progressively engage and lift a windrow from the ground surface as the wheeled frame is moved forwardly along the windrow W.

The pick-up reel 26 may be driven by conventional pick-up reel drive mechanisms such as PTO (power take-off) drives, ground engaging wheel drives, hydraulic motor drives, engine drives, or other drive mechanisms well known in the baler art. In the example illustrated, a chain drive 30 is connected between one of the wheels 20 and the reel to transmit rotational motion of the wheel to the reel as the turner is moved along.

Figure 2:
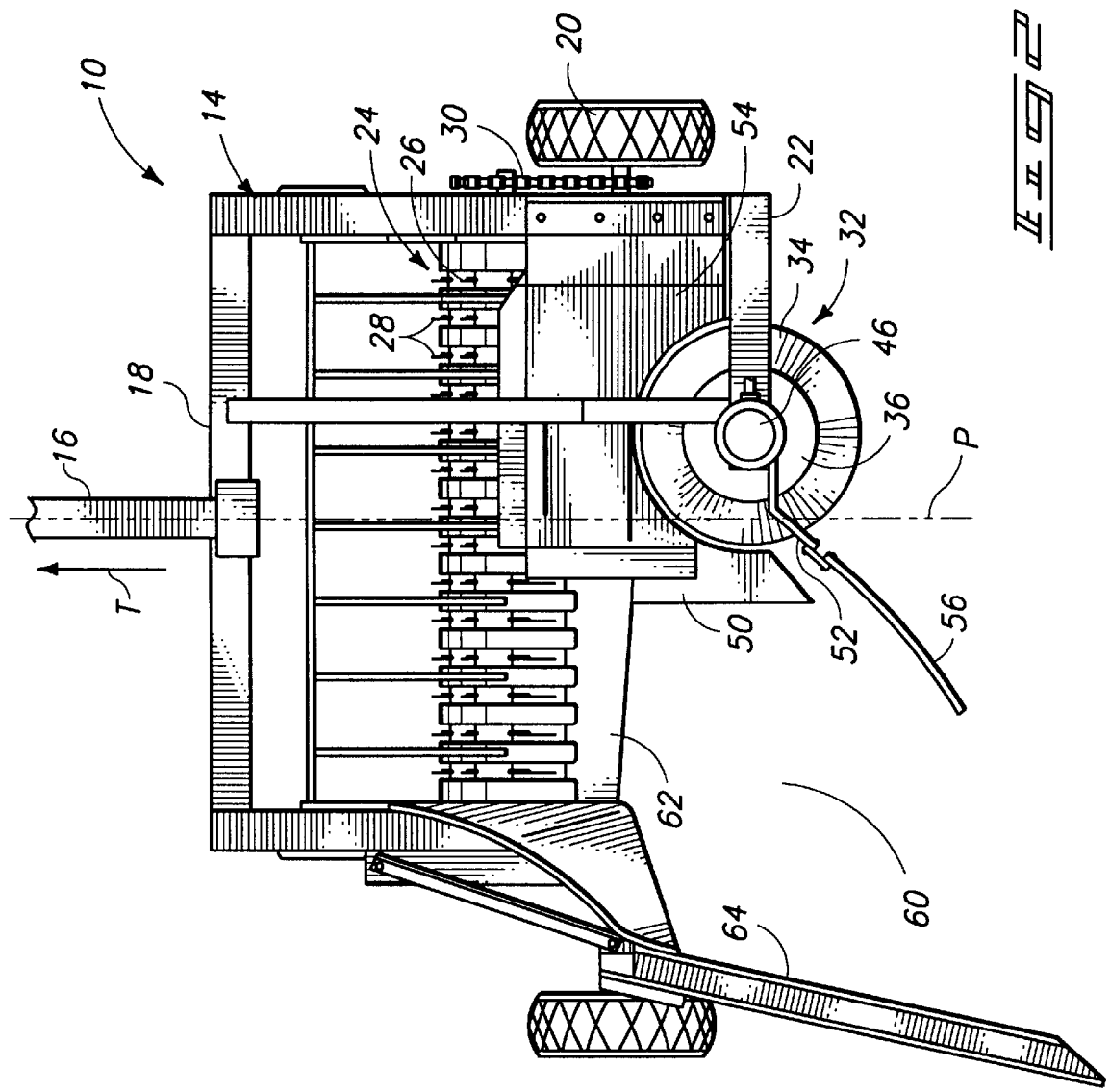
FIG. 2 is a fragmented top plan view of the preferred windrow turner.

For purposes of further description, the preferred pick-up reel is shown in FIG. 2 to be intersected by a central vertical reference plane P that is substantially parallel to the forward path of travel. The plane P as illustrated bisects the reel, dividing the reel into equal lengths on opposite sides of the plane P.

In a preferred embodiment, a substantially upright helical auger flight 32 is provided on the wheeled frame 14, rearwardly adjacent the windrow pick-up 24 and positioned to one side of the plane P. A discharge chute 38 is positioned to a side of the plane P opposite the auger flight 32.

The preferred auger flight 32 is constructed of a relatively rigid material, including a helical blade 34 extending along a central tubular hub 36. In preferred forms, the pitch of blade 34 may vary but is preferably approximately 24 inches for effective operation. The outer diameter of the auger flight (measured from the central auger axis) of approximately 24 inches has been found effective for lifting cut alfalfa windrows.

The auger flight 32 includes a base end 40 that may be mounted by a bearing 42 to the frame at or just below the elevation of the material lifted by the pick-up 24. The top end 44 of the auger is similarly mounted, with further provisions for attachment to a drive 46.

The drive 46 is connected to the substantially upright auger flight 32 and is selectively operable to rotate the auger flight about the auger axis in a lifting mode such that material engaging the rotating auger flight is lifted upwardly by the auger flight 32.

It is preferable that the auger be rotated in a counterclockwise direction (as viewed from above) such that the rotating flight will also urge material toward the discharge chute 38. Thus the auger flight will function to both lift the material and simultaneously urge it toward the discharge chute, inverting the material in the process.

In a preferred form, the drive is comprised of a hydraulic motor, though other drive mechanisms such as a chain drive similar to the drive 30 could be provided. The preferred hydraulic motor drive may be provided with appropriate known forms of controls to enable a user to select the rotation rate for the auger flight.

It is preferred that drive 30 rotate the auger flight within an rpm range of between 100 and 300. An optimum operational rpm for relatively heavy alfalfa windrows in uneven terrain is 250 rpm. The rpm may be adjusted according to the desired forward speed of the turner. The preferred auger rpm of 250 functions best at a forward speed of 4.5 mph.

In preferred forms, a guide 48 is positioned between the windrow pick-up 24 and auger flight 32. The preferred guide includes an angular deflector plate 50, situated on one side of the plane P, leading angularly upward from the windrow pick-up 24 to the auger flight 32. The preferred deflector plate 50 leads to the auger flight 32 on one side of the plane P opposite the discharge chute 38.

A cover plate 54 may be provided above the deflector plate 50 to confine the upward motion of material engaged by the auger flight 32. The cover plate 54 may have a cut-out area shaped to conform to the auger blade 34 and be inclined to deflect material lifted by the auger flight toward the discharge chute.

Figure 3:
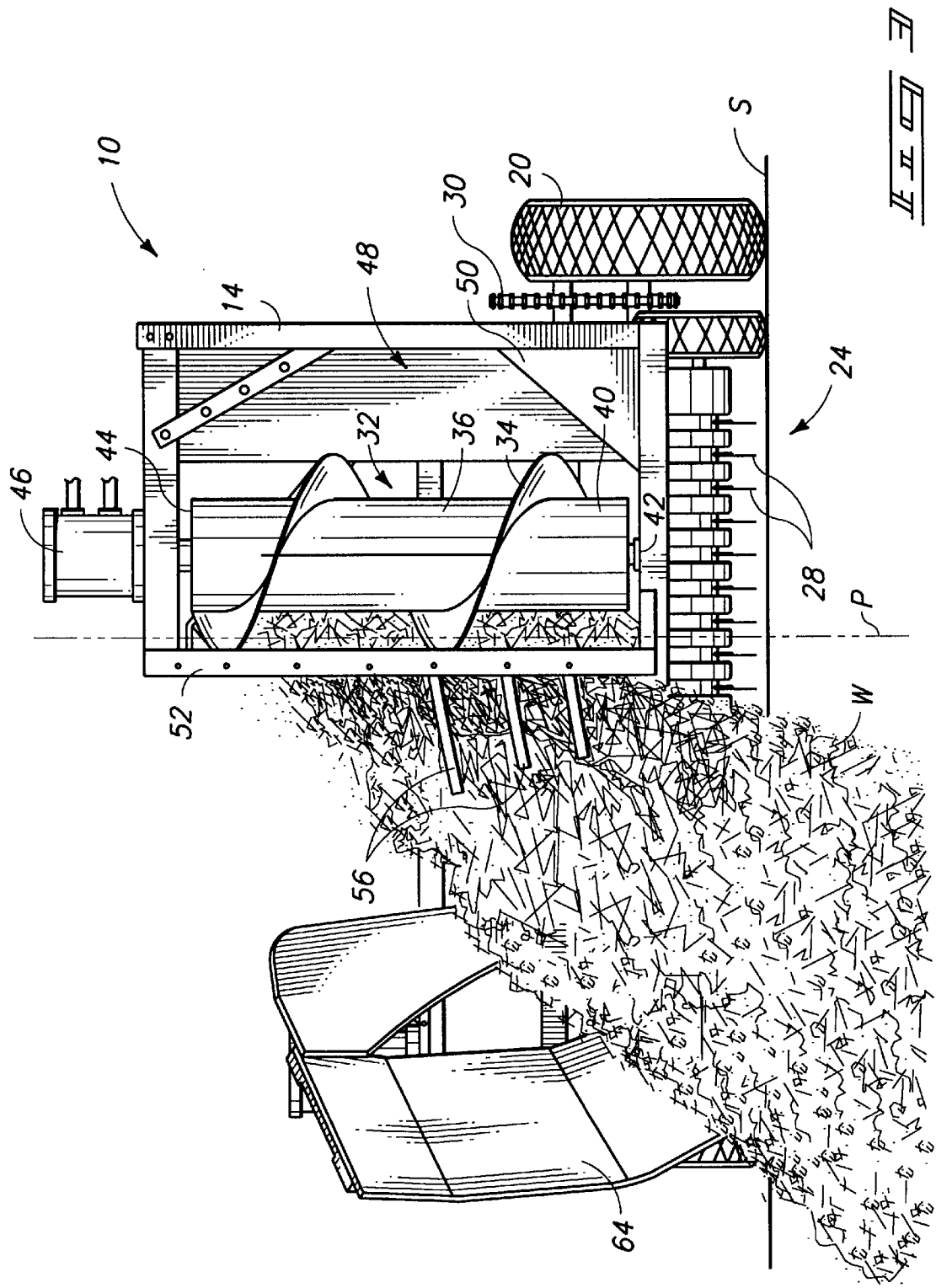
FIG. 3 is a rear elevation view showing the preferred windrow turner in operation.
Figure 4:
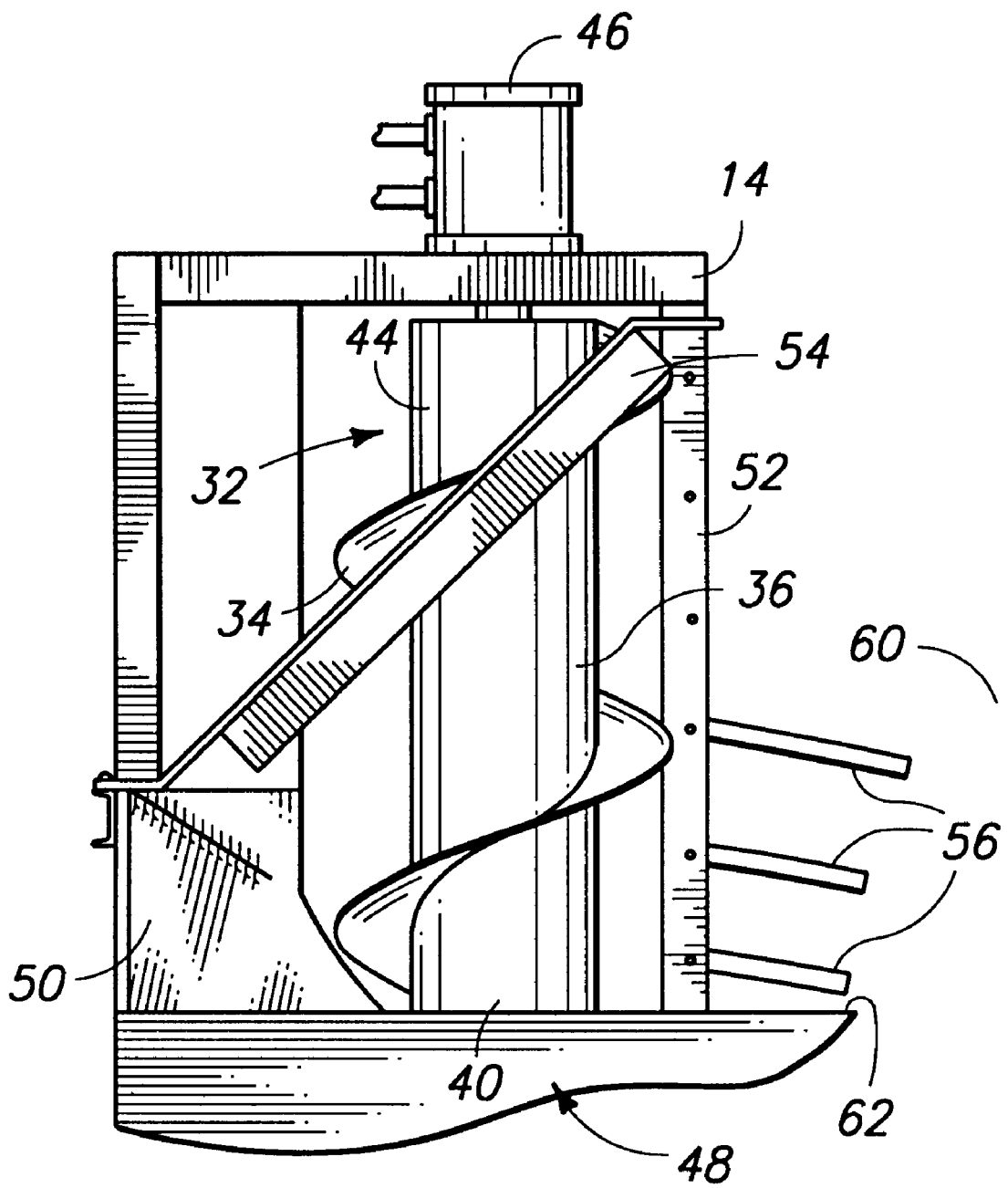
FIG. 4 is a fragmented detail view of a preferred auger flight and guide arrangement.

A substantially upright stripper member 52 is advantageously positioned along the auger flight 32 rearwardly of the auger axis and toward the side of plane P opposite the deflector plate 50 to strip material from the auger and deflect it toward the discharge chute 38. To this end, the stripper may be supplied with rearwardly projecting fingers 56 that serve to guide the stripped material toward the discharge chute 60. The fingers are spaced apart elevationally along the stripper member 52 as shown in FIGS. 1 and 3.

The stripper member 52 and fingers 56 define one side of the discharge chute 38 which is positioned adjacent the rearward end of the frame. The other sides of the discharge chute are comprised of a floor 62 and a batter board 64. The floor is preferably horizontal and is situated at the approximate level of the auger flight 32. It is formed as a smooth plate to allow the material to slide easily from the chute 38 and off the end of the turner.

The batter board 64 may be comprised of a plate formed by a flexible material such as rubber belting, and is situated across the discharge chute from the auger flight 32. The board, as shown in FIGS. 2 and 5 is used to limit the lateral displacement of material turned by the auger flight 32 and thereby form one longitudinal edge of the turned windrow. The opposite edge of the turned windrow is determined by the fingers 56.

Operation of the presently preferred forms of the invention may now be understood. Operation will be described assuming a tractor 12 is pulling the turner 10 along an elongated windrow of cut vegetation such as alfalfa. The driver will maneuver the tractor and turner into a relationship such as illustrated in FIG. 5 where the windrow may be engaged at the approximate center of the pick-up 24.

As the turner 10 is moved forwardly, the pick-up will progressively lift the windrow up and rearwardly onto the guide 48. The guide allows the material to slide rearwardly. The plate 50 lifts and tips at least part of the material toward the rotating auger flight 32.

The auger flight, rotating as the turner moves along will progressively lift and simultaneously "fluff" the windrow material from one side of the plane P. The lifted and "fluffed" material will engage the stripper 52 and be deflected toward the discharge chute. Since it is lifted from one side, the windrow will be inverted from its initial position by action of the auger flight 32 and by the various guide surfaces and stripper. The material becomes progressively inverted in an even flow as indicated in FIG. 5 before it is deposited back onto the ground.

The inverted windrow is displaced laterally from its original position on the ground surface (FIG. 5) so the freshly turned materials will be allowed to return to ground space which is likely to be much drier than the ground surface under the un-turned windrow ahead of the turner 10.

Thus the windrow is fluffed, inverted, and repositioned by operation of the present device.

It is noted that the present turner will function well in tight turns, on side hills, on moving uphill or downhill. This is due to the auger flight which will operate consistently at any angle, and since there is very little sliding action of the materials along surfaces of the turner to be affected by gravity. Further it has been found that the present turner will operate smoothly and effectively to invert dense, wet windrows without binding or producing clumps of turned material.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A windrow turner, comprising:

a wheeled frame including a forward and a rearward end;

a windrow pick-up on the frame;

a discharge chute on the frame;

a substantially upright helical auger flight on the wheeled frame adjacent the windrow pick-up and discharge chute;

a drive connected to the substantially upright auger flight and selectively operable to rotate the auger flight about an auger axis in a lifting mode such that material engaging the rotating auger flight is lifted upwardly by the auger flight; and a guide assembly between the windrow pick-up and auger flight, leading angularly upward and toward the discharge chute from the windrow pick-up to the auger flight;

whereby material lifted by the windrow pick-up is directed by the guide assembly toward the substantially upright auger and wherein the rotating auger and guide assembly will lift, turn, and deliver the material to the discharge chute.

2. A windrow turner as defined by claim 1 wherein the auger flight is rotated within a range of approximately 100 and 300 rpm.

3. A windrow turner as defined by claim 1 wherein the auger flight is rotated at approximately 250 rpm.

4. A windrow turner as defined by claim 1 wherein the guide assembly includes an angular deflector plate leading to the auger flight, and further comprising a substantially upright stripper member positioned along the auger flight and leading toward the discharge chute.

5. A windrow turner as defined by claim 1 further comprising a substantially upright stripper member positioned adjacent the auger flight rearward of the auger axis.

6. A windrow turner as defined by claim 1 wherein the drive connected to the substantially upright auger flight is comprised of a motor mounted between the frame and auger flight, and powered to rotate the auger flight about the auger axis.

7. A windrow turner as defined by claim 1 wherein the drive is configured to rotate the auger flight about the auger axis in a direction such that material lifted by the auger flight is also urged toward the discharge chute.

8. A windrow turner as defined by claim 1 wherein the drive is configured to rotate the auger flight about the auger axis in a counter-clockwise direction as viewed from above such that material lifted by the auger flight is also urged toward the discharge chute.

9. A windrow turner as defined by claim 1 wherein the drive connected to the substantially upright auger flight is comprised of a hydraulic motor mounted between the frame and auger flight, and powered to rotate the auger flight about the auger axis.

10. A windrow turner for lifting and inverting an elongated windrow of vegetation formed along a ground surface, comprising:

a wheeled frame including a forward and a rearward end for movement in a forward path of travel along the ground surface;

a windrow pick-up on the frame, configured to progressively engage and lift vegetation from the ground surface as the wheeled frame is moved forwardly along the windrow;

a substantially upright helical auger flight and guide assembly mounted to the wheeled frame rearwardly adjacent the windrow pick-up with an auger flight rotatable about a substantially upright auger axis and driven to engage and turn at least a portion of the vegetation lifted by the windrow pick-up; and a discharge chute on the frame positioned to one side of the auger flight to receive and guide the windrow, lifted by the windrow pick-up and turned by the helical auger flight and guide assembly, back to the ground surface.

11. A windrow turner as defined by claim 10 further comprising a drive mounted to the auger flight and operable to rotate the auger flight about the auger axis in a direction about the auger axis to engage and lift material, and to urge the material toward the discharge chute.

12. A windrow turner as defined by claim 10 further comprising a drive connected to the auger flight to rotate the auger flight about the auger axis in a counter-clockwise direction as viewed from above to lift materials and to urge the lifted materials toward the discharge chute.

13. A windrow turner as defined by claim 10 wherein the auger flight is rotated within a range of approximately 100 and 300 rpm.

14. A windrow turner as defined by claim 10 wherein the auger flight is rotated at approximately 250 rpm.

15. A windrow turner as defined by claim 10 further comprising an angular deflector plate leading to the auger flight, and further comprising a substantially upright stripper member positioned along the auger flight on a side of the auger axis and adjacent the discharge chute.

16. A windrow turner as defined by claim 10 further comprising a substantially upright stripper member positioned along side the auger flight rearward of the auger axis.

17. A windrow turner as defined by claim 10 further comprising a drive connected to the substantially upright auger flight for rotating the auger flight about the auger axis.

18. A windrow turner as defined by claim 10 further comprising a drive connected to the substantially upright auger flight for rotating the auger flight about the auger axis and wherein the drive is comprised of a motor mounted between the frame and auger flight and powered to rotate the auger flight about the auger axis.

19. A windrow turner as defined by claim 10 further comprising a drive connected to the substantially upright auger flight for rotating the auger flight about the auger axis and wherein the drive is comprised of a hydraulic motor mounted between the frame and auger flight and powered to rotate the auger flight about the auger axis within a range of approximately 100 and 300 rpm.

20. A windrow turner for lifting and inverting an elongated windrow of vegetation formed along a ground surface while moving forwardly along the windrow, comprising:

a wheeled frame including a forward and a rearward end for movement in a forward path of travel along the ground surface;

a windrow pick-up reel on the frame adjacent the forward end, with rake tines rotatable on a reel axis that is substantially horizontal and normal to the forward path of travel and configured to progressively engage and lift a windrow from the ground surface as the wheeled frame is moved forwardly along the windrow;

the windrow pick-up reel being intersected by a vertical reference plane substantially parallel to the forward path of travel;

a guide assembly on the frame rearwardly adjacent the windrow pick-up reel and situated to one side of the reference plane;

a substantially upright helical auger flight mounted to the wheeled frame rearwardly adjacent the windrow pick-up with an auger flight rotatable about an auger axis substantially normal to the reel axis and including a base end situated on the one side of the reference plane;

a discharge chute on the frame positioned to a side of the reference plane opposite the one side;

a drive connected to the auger flight and configured to rotate the auger about the auger axis to engage the windrow lifted by the windrow pick-up reel and, along with the guide assembly, progressively invert the windrow by turning the windrow laterally toward the discharge chute.

21. A windrow turner as defined by claim 20 further comprising a stripper member positioned toward the opposite side of the reference plane and adjacent to the auger flight rearward of the auger axis.

* * * * *